(12) United States Patent
Womack et al.

(10) Patent No.: US 8,355,388 B2
(45) Date of Patent: Jan. 15, 2013

(54) SYSTEM AND METHOD FOR INITIAL ACCESS TO RELAYS

(75) Inventors: James Earl Womack, Bedford, TX (US); Zhijun Cai, Euless, TX (US); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 427 days.

(21) Appl. No.: 12/337,235

(22) Filed: Dec. 17, 2008

(65) Prior Publication Data

US 2010/0150103 A1   Jun. 17, 2010

(51) Int. Cl.
*H04W 4/00* (2009.01)

(52) U.S. Cl. ...................................................... 370/338

(58) Field of Classification Search .................. None
See application file for complete search history.

(56) References Cited

U.S. PATENT DOCUMENTS

| | | | |
|---|---|---|---|
| 6,014,375 A | 1/2000 | Janky | |
| 6,512,745 B1 | 1/2003 | Abe et al. | |
| 6,690,657 B1 | 2/2004 | Lau et al. | |
| 6,785,510 B2 * | 8/2004 | Larsen | 455/11.1 |
| 7,054,633 B2 | 5/2006 | Seo et al. | |
| 7,061,879 B2 | 6/2006 | Oprescu-Surcobe et al. | |
| 7,130,614 B2 | 10/2006 | Sreemanthula et al. | |
| 7,227,851 B1 | 6/2007 | Gopalakrishnan et al. | |
| 7,349,665 B1 | 3/2008 | Zhu et al. | |
| 7,386,036 B2 | 6/2008 | Pasanen et al. | |
| 7,564,827 B2 | 7/2009 | Das et al. | |
| 7,577,124 B2 | 8/2009 | Yomo et al. | |
| 7,602,843 B2 | 10/2009 | Cho et al. | |
| 7,673,211 B2 | 3/2010 | Meyer et al. | |
| 7,706,408 B2 | 4/2010 | Takagi et al. | |
| 7,724,767 B2 | 5/2010 | Oksman | |
| 7,742,448 B2 | 6/2010 | Ramachandran et al. | |
| 7,830,837 B2 | 11/2010 | Park et al. | |
| 7,873,002 B2 | 1/2011 | Cai | |
| 7,898,948 B2 * | 3/2011 | DiGirolamo et al. | 370/230 |
| 8,121,552 B2 | 2/2012 | Agami et al. | |
| 8,228,851 B2 | 7/2012 | Wu | |
| 2002/0155839 A1 | 10/2002 | Nisbet | |

(Continued)

FOREIGN PATENT DOCUMENTS

EP   1534035 A1   5/2005

(Continued)

OTHER PUBLICATIONS

Womack, James Earl, et al.; U.S. Appl. No. 12/331,992, filed Dec. 10, 2008; Title: Method and Apparatus for Discovery of Relay Nodes.

(Continued)

*Primary Examiner* — Fan Ng

(74) *Attorney, Agent, or Firm* — Conley Rose, P.C.; J. Robert Brown, Jr.

(57) ABSTRACT

A user agent (UA) in a wireless communication system. The UA is configured to transmit a preamble on a random access channel (RACH) to an access node in order to attach to the access node. The UA transmits a message to the access node, wherein the message contains an identity of one or more relay nodes to which the UA can be transferred. The UA requests the access node to hand-over the UA to one relay node of the one or more relay nodes.

34 Claims, 6 Drawing Sheets

U.S. PATENT DOCUMENTS

| | | | |
|---|---|---|---|
| 2002/0187746 A1 | 12/2002 | Cheng et al. | |
| 2003/0096631 A1 | 5/2003 | Kayama et al. | |
| 2003/0103480 A1 | 6/2003 | You et al. | |
| 2004/0042492 A1* | 3/2004 | Suzuki et al. | 370/473 |
| 2004/0063451 A1* | 4/2004 | Bonta et al. | 455/519 |
| 2005/0042987 A1 | 2/2005 | Lee et al. | |
| 2005/0232212 A1* | 10/2005 | Kang et al. | 370/338 |
| 2006/0183421 A1 | 8/2006 | Proctor, Jr. et al. | |
| 2007/0104148 A1* | 5/2007 | Kang et al. | 370/331 |
| 2007/0153734 A1 | 7/2007 | Lee et al. | |
| 2007/0155315 A1 | 7/2007 | Lee et al. | |
| 2007/0171925 A1 | 7/2007 | Tanimoto | |
| 2007/0206531 A1 | 9/2007 | Pajukoski et al. | |
| 2007/0253421 A1 | 11/2007 | Cai | |
| 2008/0002610 A1 | 1/2008 | Zheng et al. | |
| 2008/0025323 A1 | 1/2008 | Khan | |
| 2008/0043671 A1* | 2/2008 | Moon et al. | 370/329 |
| 2008/0043710 A1 | 2/2008 | Zhou et al. | |
| 2008/0081628 A1 | 4/2008 | Ye et al. | |
| 2008/0089282 A1 | 4/2008 | Malladi et al. | |
| 2008/0107076 A1 | 5/2008 | Ramachandran et al. | |
| 2008/0107078 A1 | 5/2008 | Viorel et al. | |
| 2008/0108303 A1 | 5/2008 | Okuda | |
| 2008/0108304 A1 | 5/2008 | Suga | |
| 2008/0159337 A1 | 7/2008 | Lee | |
| 2008/0165776 A1 | 7/2008 | Tao et al. | |
| 2008/0212513 A1 | 9/2008 | Tao et al. | |
| 2008/0225765 A1 | 9/2008 | Marinier et al. | |
| 2008/0225772 A1 | 9/2008 | Xu | |
| 2008/0227461 A1 | 9/2008 | Dayal et al. | |
| 2008/0232284 A1 | 9/2008 | Dalsgaard et al. | |
| 2008/0232493 A1 | 9/2008 | Zhang et al. | |
| 2008/0247375 A1 | 10/2008 | Muharemovic et al. | |
| 2008/0285500 A1 | 11/2008 | Zhang et al. | |
| 2008/0285501 A1 | 11/2008 | Zhang et al. | |
| 2008/0293358 A1 | 11/2008 | Andersson et al. | |
| 2008/0310389 A1 | 12/2008 | Suzuki et al. | |
| 2009/0010199 A1 | 1/2009 | Adachi et al. | |
| 2009/0046641 A1 | 2/2009 | Wang et al. | |
| 2009/0061892 A1 | 3/2009 | Lee et al. | |
| 2009/0111476 A1 | 4/2009 | Hamalainen et al. | |
| 2009/0116423 A1 | 5/2009 | Ni et al. | |
| 2009/0154533 A1 | 6/2009 | Khayrallah et al. | |
| 2009/0190522 A1 | 7/2009 | Horn et al. | |
| 2009/0191882 A1 | 7/2009 | Kovacs et al. | |
| 2009/0196332 A1 | 8/2009 | Miyatani | |
| 2009/0239568 A1 | 9/2009 | Bertrand et al. | |
| 2009/0252079 A1 | 10/2009 | Zhang et al. | |
| 2009/0264077 A1 | 10/2009 | Damnjanovic | |
| 2009/0276672 A1 | 11/2009 | Lee et al. | |
| 2009/0291679 A1 | 11/2009 | Wu | |
| 2009/0303918 A1 | 12/2009 | Ma et al. | |
| 2009/0313518 A1 | 12/2009 | Shen et al. | |
| 2009/0325480 A1 | 12/2009 | Ji et al. | |
| 2009/0325618 A1 | 12/2009 | Aiba et al. | |
| 2010/0027457 A1 | 2/2010 | Okuda | |
| 2010/0027458 A1 | 2/2010 | Wu et al. | |
| 2010/0039947 A1 | 2/2010 | Li et al. | |
| 2010/0046413 A1 | 2/2010 | Jin et al. | |
| 2010/0046418 A1 | 2/2010 | Horn et al. | |
| 2010/0056197 A1 | 3/2010 | Attar et al. | |
| 2010/0061361 A1 | 3/2010 | Wu | |
| 2010/0074209 A1 | 3/2010 | Montojo et al. | |
| 2010/0091759 A1 | 4/2010 | Stahl et al. | |
| 2010/0098045 A1 | 4/2010 | Miyazaki | |
| 2010/0103845 A1 | 4/2010 | Ulupinar et al. | |
| 2010/0120442 A1 | 5/2010 | Zhuang et al. | |
| 2010/0131814 A1 | 5/2010 | Chiu | |
| 2010/0135231 A1 | 6/2010 | Harada et al. | |
| 2010/0135251 A1* | 6/2010 | Sambhwani et al. | 370/331 |
| 2010/0142433 A1* | 6/2010 | Womack et al. | 370/315 |
| 2010/0157845 A1* | 6/2010 | Womack et al. | 370/254 |
| 2010/0182992 A1 | 7/2010 | Chun et al. | |
| 2010/0271999 A1 | 10/2010 | Yu et al. | |
| 2010/0297993 A1 | 11/2010 | Heo et al. | |
| 2010/0302998 A1* | 12/2010 | Bao et al. | 370/315 |
| 2010/0322145 A1* | 12/2010 | Yu et al. | 370/315 |
| 2010/0322194 A1 | 12/2010 | Hu et al. | |
| 2010/0323612 A1 | 12/2010 | Xu et al. | |
| 2010/0323614 A1* | 12/2010 | Yu et al. | 455/9 |
| 2010/0323684 A1 | 12/2010 | Cai et al. | |
| 2010/0325506 A1 | 12/2010 | Cai et al. | |
| 2011/0026409 A1* | 2/2011 | Hu et al. | 370/243 |
| 2011/0041027 A1 | 2/2011 | Fong et al. | |
| 2011/0092212 A1 | 4/2011 | Kubota | |
| 2011/0110258 A1* | 5/2011 | Ishii et al. | 370/252 |
| 2011/0261763 A1 | 10/2011 | Chun et al. | |

FOREIGN PATENT DOCUMENTS

| | | |
|---|---|---|
| EP | 1773091 A2 | 4/2007 |
| EP | 1775983 A1 | 4/2007 |
| EP | 1883178 A2 | 1/2008 |
| EP | 1890402 A2 | 2/2008 |
| EP | 1919234 A2 | 5/2008 |
| EP | 1940185 A1 | 7/2008 |
| EP | 1959708 A1 | 8/2008 |
| EP | 1995921 A2 | 11/2008 |
| JP | 2004328665 A | 11/2004 |
| JP | 2006311253 A | 11/2006 |
| JP | 2008034335 A | 2/2008 |
| JP | 2008060951 A | 3/2008 |
| JP | 2008511210 A | 4/2008 |
| JP | 2008104096 A | 5/2008 |
| JP | 2008118499 A | 5/2008 |
| JP | 2008118500 A | 5/2008 |
| JP | 2008118652 A | 5/2008 |
| JP | 2008167141 A | 7/2008 |
| JP | 2008172754 A | 7/2008 |
| JP | 2008172759 A | 7/2008 |
| JP | 2008537379 A | 9/2008 |
| JP | 2008271270 A | 11/2008 |
| JP | 2009520435 A | 5/2009 |
| JP | 2009521891 A | 6/2009 |
| JP | 2009524323 A | 6/2009 |
| JP | 2009182944 A | 8/2009 |
| JP | 2009539299 A | 11/2009 |
| JP | 2010504665 A | 2/2010 |
| JP | 2010136337 A | 6/2010 |
| WO | 0137590 A1 | 5/2001 |
| WO | 2005064872 A1 | 7/2005 |
| WO | 2006024321 A1 | 3/2006 |
| WO | 2007048247 A1 | 5/2007 |
| WO | 2007053950 A1 | 5/2007 |
| WO | 2007053954 A1 | 5/2007 |
| WO | 2007060731 A1 | 5/2007 |
| WO | 2007064249 A1 | 6/2007 |
| WO | 2007073121 A1 | 6/2007 |
| WO | 2007078142 A1 | 7/2007 |
| WO | 2007083230 A2 | 7/2007 |
| WO | 2007110447 A1 | 10/2007 |
| WO | 2007131347 A1 | 11/2007 |
| WO | 2008004806 A1 | 1/2008 |
| WO | 2008009228 A1 | 1/2008 |
| WO | 2008022132 A2 | 2/2008 |
| WO | 2008040930 A1 | 4/2008 |
| WO | 2008047870 A1 | 4/2008 |
| WO | 2008050961 A1 | 5/2008 |
| WO | 2008078365 A1 | 7/2008 |
| WO | 2008084949 A1 | 7/2008 |
| WO | 2008103981 A2 | 8/2008 |
| WO | 2008109912 A1 | 9/2008 |
| WO | 2008115826 A1 | 9/2008 |
| WO | 2008133307 A1 | 11/2008 |
| WO | 2008149979 A1 | 12/2008 |
| WO | 2009017005 A1 | 2/2009 |
| WO | 2009088172 A2 | 7/2009 |
| WO | 2009154038 A1 | 12/2009 |
| WO | 2010002100 A2 | 1/2010 |

OTHER PUBLICATIONS

Womack, James Earl, et al.; U.S. Appl. No. 12/340,418, filed Dec. 19, 2008; Title: System and Method for Relay Node Selection.

Yu, Yi, et al.; U.S. Appl. No. 12/337,229, filed Dec. 17, 2008; Title: System and Method for Hybrid Automatic Repeat Request (HARQ) Functionality in a Relay Node.

Cai, Zhijun, et al.; U.S. Appl. No. 12/340,412, filed Dec. 19, 2008; Title: System and Method for Resource Allocation.
Yu, Yi, et al.; U.S. Appl. No. 12/337,207, filed Dec. 17, 2008; Title: System and Method for Multi-User Multiplexing.
Cai, Zhijun, et al.; U.S. Appl. No. 12/337,214, filed Dec. 17, 2008; Title: System and Method for Autonomous Combining.
Yu, Yi, et al.; U.S. Appl. No. 12/340,432, filed Dec. 19, 2008; Title: Multiple-Input Multiple-Output (MIMO) with Relay Nodes.
Cai, Zhijun, et al.; U.S. Appl. No. 12/337,222, filed Dec. 17, 2008; Title: System and Method for a Relay Protocol Stack.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 117 pgs.; Part 1.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 101 pgs.; Part 2.
IEEE P802.16j/D9; Part 16: Air Interface for Fixed and Mobile Broadband Wireless Access Systems—Multihop Relay Specification; Draft Amendment to IEEE Standard for Local and Metropolitan Area Networks; Feb. 4, 2009; 96 pgs.; Part 3.
PCT International Search Report; PCT Application No. PCT/US2009/030967; Sep. 8, 2009; 5 pgs.
PCT Written Opinion of the International Searching Authority; PCT Application No. PCT/US2009/030967; Sep. 8, 2009; 9 pgs.
3GPP TR 36.814 v0.4.1; 3rd Generation Partnership Project; Technical Specification Group Radio Access Network; Further Advancements for E-UTRA Physical Layer Aspects; Release 9; Feb. 2009; 31 pgs.
Panasonic; 3GPP TSG RAN WG1 Meeting #54bis; Title: Discussion on the TD Relay and FD Relay for FDD System; R1-083676; Prague, Czech Republic; Sep. 29-Oct. 3, 2008; 5 pgs.
Texas Instruments; 3GPP TSG RAN WG1 #54bis; Title: Decod and Forward Relays for E-UTRA Enhancements; R1-083533; Prague, Czech Republic; Sep. 29-Oct. 3, 2008; 5 pgs.
3GPP TS 36.331 v8.3.0; 3rd Generation Partnership Project; Technical Specification Group Radio Access Network; Evolved Universal Terrestrial Radio Access (E-UTRA) Radio Resource Control (RRC); Protocol Specification; Release 8; Sep. 2008; 178 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.304 v8.3.0; 3rd Generation Partnership Project; Technical Specification Group Radio Access Network; Evolved Universal Terrestrial Radio Access (E-UTRA); User Equipment (UE) Procedures in Idle Mode; Release 8; 28 pgs.
3GPP TS 36.321 v8.3.0; 3rd Generation Partnership Porject; Technical Specification Group Radio Access Network; Evolved Universal Terrestrial Radio Access (E-UTRA) Medium Access Control (MAC) Protocol Specification; Release 8; Sep. 2008; 36 pgs.
Qualcomm Europe; 3GPP TSG-RAN WG1 #54; Title: Operation of Relays in LTE-A; R1-083191; Jeju, S. Korea; Aug. 18-22, 2008; 5 pgs.
Mitsubishi Electric; 3GPP TSG RAN WG1 #54 Meeting; Title: Basic Structure of Relaying under Multi-Antenna eNB; R1-082775; Jeju Island, Korea; Aug. 18-22, 2008; 4 pgs.
China Mobile, Vodafone, Huawei; TSG-RAN WG1 #54; Title: Application Scenarios for LTE-Advanced Relay; R1-082975; Jeju, Korea; Aug. 18-22, 2008; 7 pgs.
Motorola; TSG-RAN WG1 #54; Title: Classification of Relays; R1-083223; Jeju, South Korea; Aug. 18-22, 2008; 3 pgs.
Samsung; 3GPP TSG RAN WG1 Meeting #53bis; Title: Application of Network Coding in LTE-Advanced Relay; R1-082327; Warsaw, Poland; Jun. 30-Jul. 4, 2008; 4 pgs.
Ericsson; TSG-RAN WG1 #53; Title: A Discussion on Some Technology Components for LTE-Advanced; R1-082024; Kansas City, Missouri; May 5-9, 2008; 11 pgs.
3GPP TR 36.913 v1.0.0; 3rd Generation Partnership Project; Technical Specification Group Radio Access Network; Requirements for Further Advancements for E-UTRA (LTE-Advanced); Release 8; May 2008; 13 pgs.

Soldani, David et al.; Title: Wireless Relays for Broadband Access; IEEE Communications Magazine; Mar. 2008; pp. 58-66.
Pabst, Ralf et al.; Title: Relay-Based Deployment Concepts for Wireless and Mobile Broadband Radio; IEEE Communications Magazine; Sep. 2004; pp. 80-89.
PCT International Search Report; PCT Application No. PCT/US2009/062574; Jul. 19, 2010; 6 pgs.
PCT Written Opinion of the International Searching Authority; PCT Application No. PCT/US2009/062574; Jul. 19, 2010; 9 pgs.
PCT International Preliminary Report on Patentability; PCT Application No. PCT/US2009/062571; Mar. 10, 2011; 8 pgs.
Office Action dated Jan. 25, 2011, 39 pages, U.S. Appl. No. 12/337,207, filed Dec. 17, 2008.
Notice of Allowance dated Mar. 25, 2011, 11 pages, U.S. Appl. No. 12/337,214, filed Dec. 17, 2008.
Final Office Action dated Jan. 14, 2011, 16 pages, U.S. Appl. No. 12/337,222, filed Dec. 17, 2008.
3GPP TS 36.321 v8.1.0; 3rd Generation Partnership Project; Technical Specification Group Radio Access Network; Evolved Universal Terrestrial Radio Access (E-UTRA) Medium Access Control (MAC) Protocol Specification; Release 8; Mar. 2008; 30 pgs.
Panasonic; 3GPP TSG RAN WG1 Meeting #54; Title: Discussion on the Various Types of Relays; R1-082397; Warsaw, Poland; Jun. 30-Jul. 4, 2008; 6 pgs.
Research in Motion, Limited; 3GPP TSG RAN WG1 Meeting #55; Title: L2 Relay Interference Mitigation; R1-084102; Prague, Czech Republic; Nov. 10-14, 2008; 6 pgs.
Research in Motion, Limited; 3GPP TSG RAN WG1 Meeting #55-bis; Title: Relay Control Signalling Resource Coordination; R1-090027; Ljubljana, Slovenia; Jan. 12-16, 2009; 3 pgs.
PCT International Search Report; PCT Application No. PCT/US2009/062551; Jan. 28, 2010; 4 pgs.
PCT Written Opinion of the International Searching Authority; PCT Application No. PCT/US2009/062551; Jan. 28, 2010; 5 pgs.
PCT Communication Relating to the Results of the Partial International Search; PCT Application No. PCT/US2009/062554; Mar. 2, 2010; 7 pgs.
PCT International Search Report; PCT Application No. PCT/US2009/062557; Feb. 10, 2010; 4 pgs.
PCT Written Opinion of the International Searching Authority; PCT Application No. PCT/US2009/062557; Feb. 10, 2010; 7 pgs.
PCT International Search Report; PCT Application No. PCT/US2009/062560; Mar. 1, 2010; 4 pgs.
PCT Written Opinion of the International Searching Authority; PCT Application No. PCT/US2009/062560; Mar. 1, 2010; 7 pgs.
PCT International Search Report; PCT Application No. PCT/US2009/062570; Feb. 22, 2010; 4 pgs.
PCT Written Opinion of the International Searching Authority; PCT Application No. PCT/US2009/062570; Feb. 22, 2010; 8 pgs.
PCT Communication Relating to the Results of the Partial International Search; PCT Application No. PCT/US2009/062571; Feb. 12, 2010; 6 pgs.
PCT International Search Report; PCT Application No. PCT/US2009/064398; Mar. 18, 2010; 5 pgs.
PCT Written Opinion of the International Searching Authority; PCT Application No. PCT/US2009/064398; Mar. 18, 2010; 9 pgs.
Parkvall, Stefan, et al., The Evolution of WCDMA Towards Higher Speed Downlink Packet Data Access, XP-001082550, IEEE VTC, 2001, pp. 2287-2291.
Doppler, Klaus, et al., Assesment of Relay Based Deployment Concepts and Detailed Description of Multi-hop Capable RAN Protocols as Input for the Concept Group Work; IST-4-027756 Winner II; D3.5.2 v1.0; XP-002526747; 24 pages.
PCT International Search Report; PCT Application No. PCT/US2009/062554; May 12, 2010; 6 pgs.
PCT Written Opinion of the International Searching Authority; PCT Application No. PCT/US2009/062554; May 12, 2010; 7 pgs.
PCT International Search Report; PCT Application No. PCT/US2009/062571; Apr. 19, 2010; 6 pgs.
PCT Written Opinion of the International Searching Authority; PCT Application No. PCT/US2009/062571; Apr. 19, 2010; 6 pgs.

PCT Communication Invitation to Pay Additional Fees and, Where Applicable, Protest Fee; PCT Application No. PCT/US2009/062574; Apr. 22, 2010; 8 pgs.
Office Action dated May 26, 2010, 20 pages, U.S. Appl. No. 12/337,214, filed Dec. 17, 2008.
Cai, Zhijun, et al.; U.S. Appl. No. 12/916,214, filed Oct. 29, 2010; Title: System and Method for Autonomous Combining.
Office Action dated Jul. 12, 2010, 40 pages, U.S. Appl. No. 12/337,207, filed Dec. 17, 2008.
Notice of Allowance dated Nov. 8, 2010, 10 pages, U.S. Appl. No. 12/337,214, filed Dec. 17, 2008.
Office Action dated Aug. 17, 2010, 25 pages, U.S. Appl. No. 12/337,222, filed Dec. 17, 2008.
Cai, Zhijun, et al.; U.S. Appl. No. 13/221,584, filed Aug. 30, 2011; Title: System and Method for Autonomous Combining.
Office Action dated Aug. 19, 2011; U.S. Appl. No. 12/331,992, filed Dec. 10, 2008; 52 pgs.
Office Action dated Jul. 21, 2011; U.S. Appl. No. 12/340,418, filed Dec. 19, 2008; 34 pgs.
Office Action dated Jun. 16, 2011; U.S. Appl. No. 12/340,412, filed Dec. 19, 2008; 33 pgs.
Office Action dated Jul. 13, 2011; U.S. Appl. No. 12/337,207, filed Dec. 17, 2008; 34 pgs.
Notice of Allowance dated May 27, 2011; U.S. Appl. No. 12/337,214, filed Dec. 17, 2008; 10 pgs.
Office Action dated Jul. 18, 2011; U.S. Appl. No. 12/340,432, filed Dec. 19, 2008; 6 pgs.
Office Action dated Jun. 1, 2011; U.S. Appl. No. 12/337,222, filed Dec. 17, 2008; 2 pgs.
PCT International Preliminary Report on Patentability; PCT Application No. PCT/US2009/030967; Jun. 14, 2011; 11 pgs.
Australian Examination Report; Application No. 2009325082; Jul. 11, 2011; 2 pgs.
PCT International Preliminary Report on Patentability; PCT Application No. PCT/US2009/062551; Jun. 21, 2011; 6 pgs.
PCT International Preliminary Report on Patentability; PCT Application No. PCT/US2009/062554; Jun. 21, 2011; 8 pgs.
PCT International Preliminary Report on Patentability; PCT Application No. PCT/US2009/062557; Jun. 21, 2011; 7 pgs.
PCT International Preliminary Report on Patentability; PCT Application No. PCT/US2009/062560; Jun. 21, 2011; 8 pgs.
PCT International Preliminary Report on Patentability; PCT Application No. PCT/US2009/062570; Jun. 21, 2011; 9 pgs.
PCT International Preliminary Report on Patentability; PCT Application No. PCT/US2009/062574; Jun. 21, 2011; 10 pgs.
PCT International Preliminary Report on Patentability; PCT Application No. PCT/US2009/064398; Jun. 21, 2011; 10 pgs.
Rohde & Schwarz; "UMTS Long Term Evolution (LTE) Technology Introduction;" Application Note 1MA111; Sep. 2008; 55 pages.
Yu, Yi, et al.; U.S. Appl. No. 13/216,819, filed Aug. 24, 2011; Title: Multiple-Input Multiple-Output (MIMO) with Relay Nodes.
Cai, Zhijun, et al.; U.S. Appl. No. 13/221,583, filed Aug. 30, 2011; Title: System and Method for Autonomous Combining.
Final Office Action dated Dec. 9, 2011; U.S. Appl. No. 12/331,992, filed Dec. 10, 2008; 24 pgs.
Office Action dated Nov. 8, 2011; U.S. Appl. No. 12/340,412, filed Dec. 19, 2008; 19 pgs.
Office Action dated Sep. 16, 2011; U.S. Appl. No. 12/340,432, filed Dec. 19, 2008; 33 pgs.
Office Action dated Nov. 10, 2011; U.S. Appl. No. 13/216,819, filed Aug. 25, 2011; 19 pgs.
Final Office Action dated Jan. 5, 2012; U.S. Appl. No. 12/340,418, filed Dec. 19, 2008; 22 pgs.
Office Action dated Feb. 17, 2012; U.S. Appl. No. 12/340,412, filed Dec. 19, 2008; 19 pgs.
Final Office Action dated Dec. 16, 2011; U.S. Appl. No. 12/337,207, filed Dec. 17, 2008; 37 pgs.
Advisory Action dated Mar. 2, 2012; U.S. Appl. No. 12/337,207, filed Dec. 17, 2008; 3 pages.
Office Action dated Feb. 1, 2012; U.S. Appl. No. 12/337,222, filed Dec. 17, 2008; 20 pgs.
Australian Office Action; Application No. 2009333788; Dec. 8, 2011; 3 pages.

Office Action dated Mar. 21, 2012; U.S. Appl. No. 12/337,229, filed Dec. 17, 2008; 49 pages.
Notice of Allowance dated Jun. 12, 2012; U.S. Appl. No. 12/337,207, filed Dec. 17, 2008; 20 pages.
Final Office Action dated Mar. 23, 2012; U.S. Appl. No. 12/340,432, filed Dec. 19, 2008; 28 pgs.
Final Office Action dated Apr. 19, 2012; U.S. Appl. No. 13/216,819, filed Aug. 25, 2011; 39 pgs.
Final Office Action dated Jun. 7, 2012; U.S. Appl. No. 12/337,222, filed Dec. 17, 2008; 16 pgs.
Australian Examination Report; Application No. 2009325082; Mar. 28, 2012; 3 pages.
European Examination Report; Application No. 09748915.7; May 14, 2012; 3 pages.
European Examination Report; Application No. 09761065.3; May 7, 2012; 4 pages.
Yu, Yi, et al.; U.S. Appl. No. 13/548,817; Filing date: Jul. 13, 2012; Title: System and Method for Multi-User Multiplexing.
Notice of Allowance dated Aug. 28, 2012; U.S. Appl. No. 12/337,229, filed Dec. 17, 2008; 6 pages.
Notice of Allowance dated Aug. 10, 2012; U.S. Appl. No. 12/340,412, filed Dec. 19, 2008; 17 pgs.
Office Action dated Aug. 9, 2012; U.S. Appl. No. 12/916,214, filed Oct. 29, 2010; 51 pages.
Notice of Allowance dated Jun. 20, 2012; U.S. Appl. No. 12/340,432, filed Dec. 19, 2008; 23 pages.
Korean Office Action; Application No. 10-2011-7016626; Jul. 17, 2012; 7 pages.
European Examination Report; Application No. 09756080.9; Jun. 15, 2012; 5 pages.
3GPP TSG AN WG3 Meeting #57; "Correction of Synchronization, Handover, Trace, eMBMS Architecture, and S1 Common Functions and Procedures"; R3-071695/R2-073880; Athens, Greece; Aug. 20-24, 2007; 108 pages.
3GPP TSG-RAN-WG1 Meeting #54bis; "Further Details and Considerations of Different Types of Relays"; R1-083712; Prague, Czech Republic; Sep. 29-Oct. 3, 2008; 6 pages.
Sendonaris, Andrew, et al.; "User Cooperation Diversity—Part I: System Description"; IEEE Transactions on Communications; vol. 51, No. 11; Nov. 2003; 12 pages.
Sendonaris, Andrew, et al.; "User Cooperation Diversity—Part II: Implementation Aspects and Performance Analysis"; IEEE Transactions on Communications; vol. 51, No. 11; Nov. 2003; 10 pages.
Office Action dated Oct. 2, 2012; U.S. Appl. No. 12/340,418, filed Dec. 19, 2008; 29 pgs.
Office Action dated Oct. 12, 2012; U.S. Appl. No. 13/548,807, filed Jul. 13, 2012; 53 pages.
Final Office Action dated Nov. 27, 2012; U.S. Appl. No. 12/916,214, filed Oct. 29, 2010; 16 pages.
Office Action dated Dec. 3, 2012; U.S. Appl. No. 12/337,222, filed Dec. 17, 2008; 24 pgs.
Japanese Office Action; Application No. 2011-540716; Oct. 4, 2012; 15 pages.
Korean Office Action; Application No. 10-2011-7015882; Sep. 18, 2012; 10 pages.
Japanese Office Action; Application No. 2011-542161; Nov. 1, 2012; 17 pages.
Korean Office Action; Application No. 10-2011-7016626; Oct. 26, 2012; 8 pages.
Japanese Office Action; Application No. 2011-542162; Oct. 17, 2012; 10 pages.
Japanese Office Action; Application No. 2011-542164; Oct. 26, 2012; 7 pages.
Japanese Office Action; Application No. 2011-542165; Oct. 26, 2012; 7 pages.
Korean Office Action; Application No. 10-2011-7016425; Oct. 30, 2012; 9 pages.
Japanese Office Action; Application No. 2011-542177; Oct. 26, 2012; 10 pages.

* cited by examiner

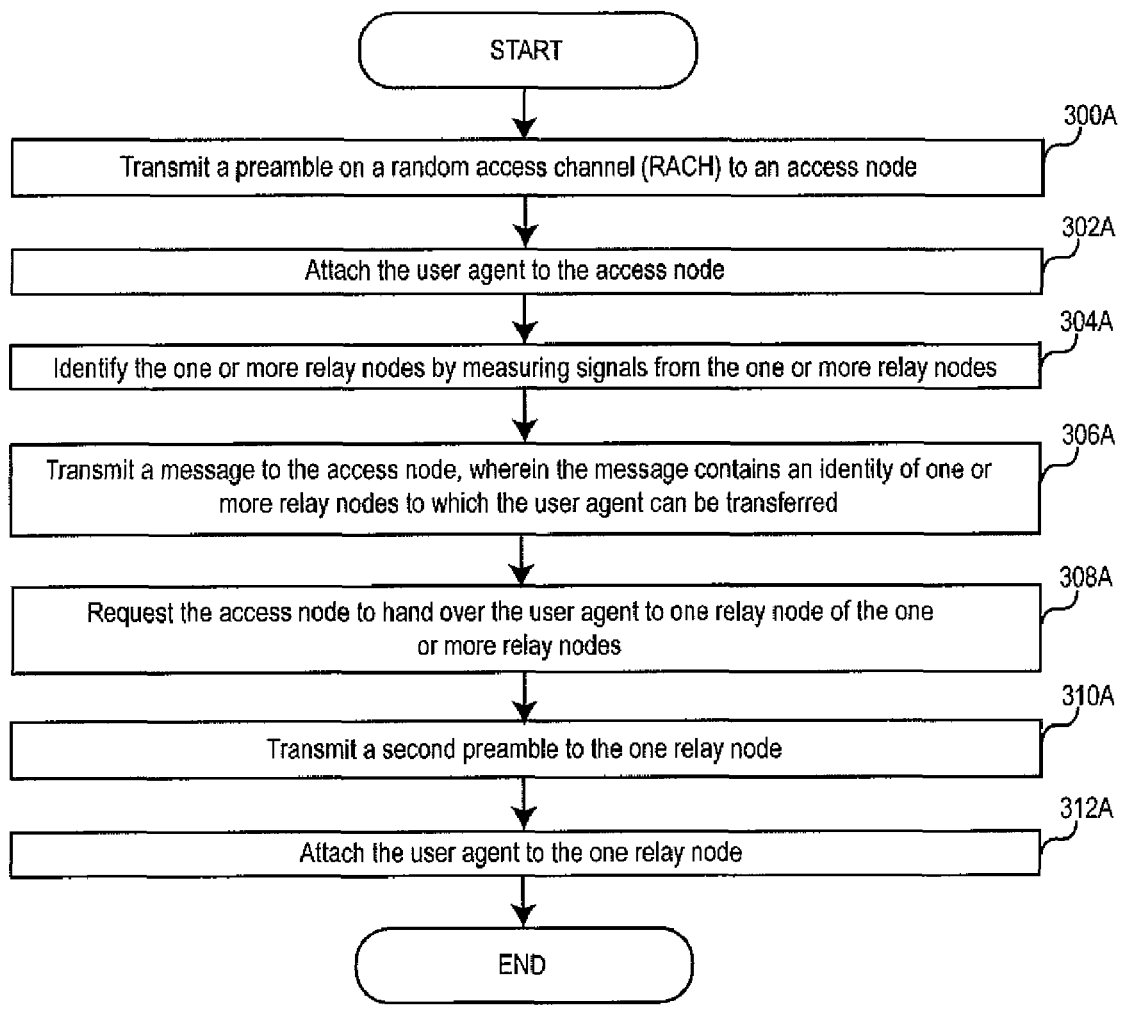

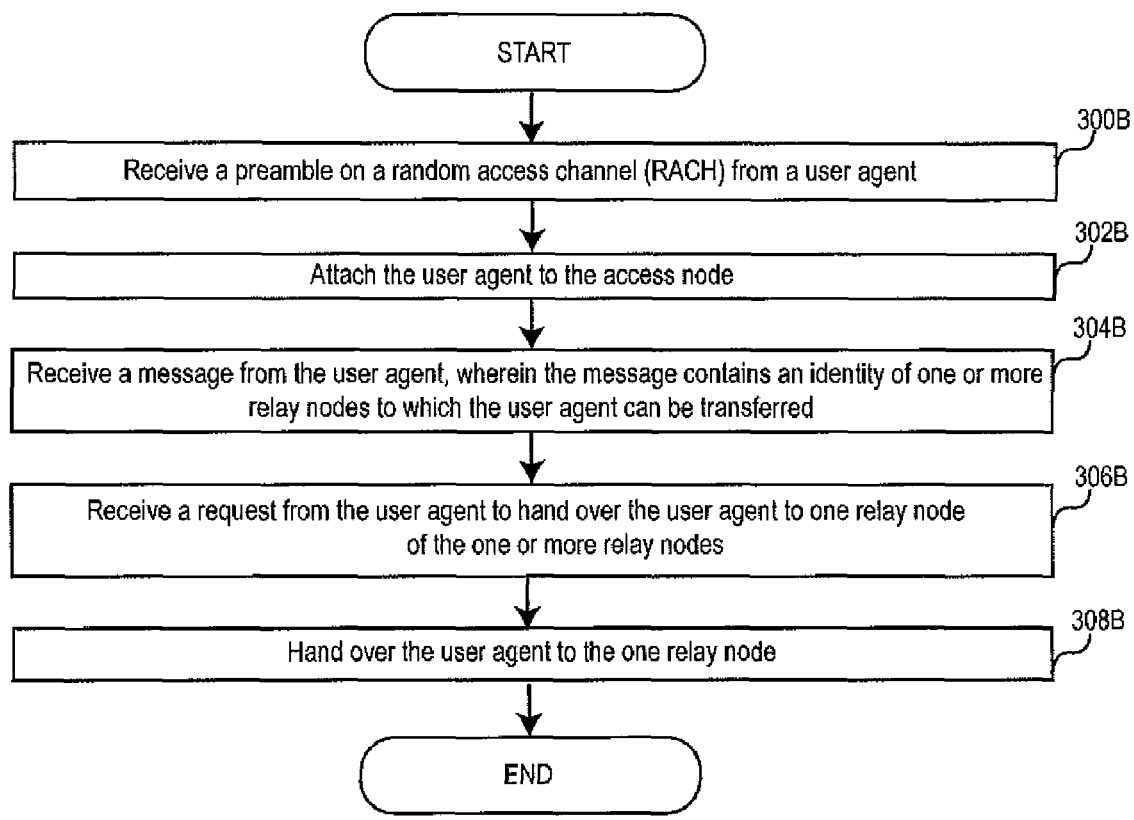

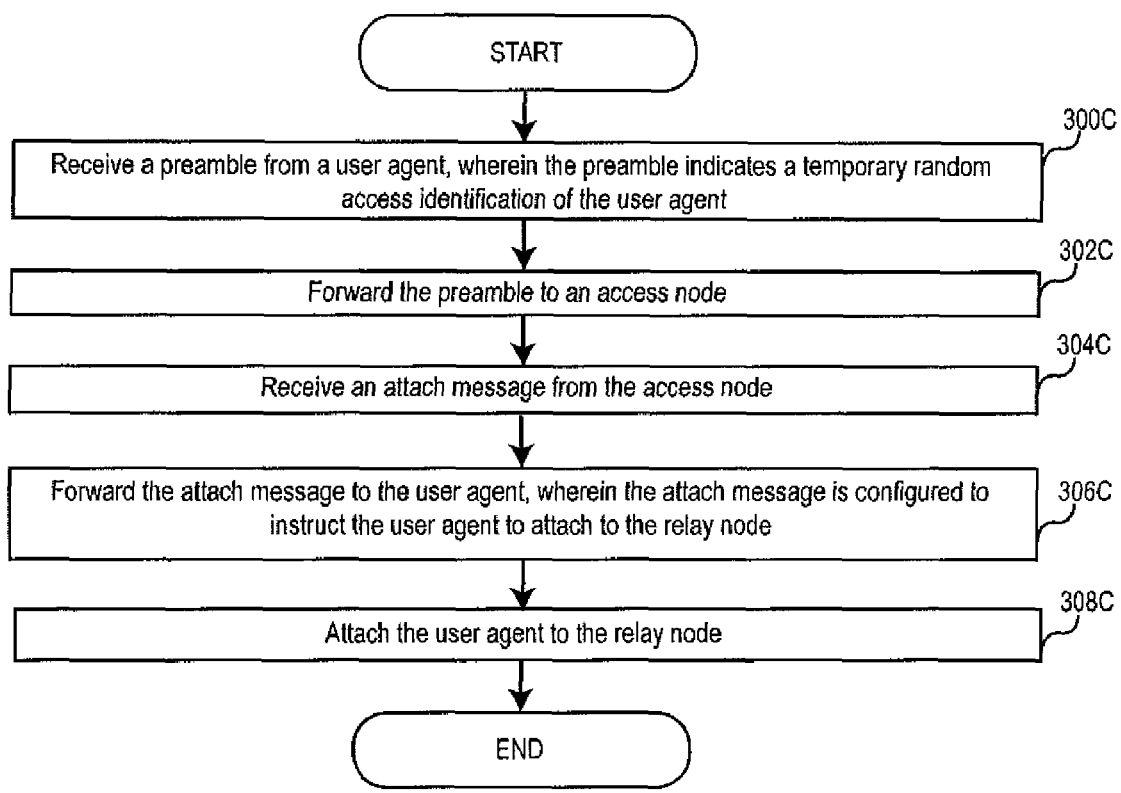

SYSTEM AND METHOD FOR INITIAL ACCESS TO RELAYS

BACKGROUND

As used herein, the terms "user agent" and "UA" might in some cases refer to mobile devices such as mobile telephones, personal digital assistants, handheld or laptop computers, and similar devices that have telecommunications capabilities. Such a UA might consist of a UA and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UA might consist of the device itself without such a module. In other cases, the term "UA" might refer to devices that have similar capabilities but that are not transportable, such as desktop computers, set-top boxes, or network appliances. The term "UA" can also refer to any hardware or software component that can terminate a communication session for a user. Also, the terms "user agent," "UA," "user equipment," "UE," "user device" and "user node" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an enhanced node B (eNB), a wireless access point, or a similar component rather than a traditional base station. As used herein, the term "access node" will refer to any component of the wireless network, such as a traditional base station, a wireless access point, or an LTE eNB, that creates a geographical area of reception and transmission coverage allowing a UA or a relay node to access other components in a telecommunications system. In this document, the term "access node" and "access node" may be used interchangeably, but it is understood that an access node may comprise a plurality of hardware and software.

The term "access node" does not refer to a "relay node," which is a component in a wireless network that is configured to extend or enhance the coverage created by an access node or another relay node. The access node and relay node are both radio components that may be present in a wireless communications network, and the terms "component" and "network node" may refer to an access node or relay node. It is understood that a component might operate as an access node or a relay node depending on its configuration and placement. However, a component is called a "relay node" only if it requires the wireless coverage of an access node to access other components in a wireless communications system. Additionally, two or more relay nodes may used serially to extend or enhance coverage created by an access node.

An LTE system can include protocols such as a Radio Resource Control (RRC) protocol, which is responsible for the assignment, configuration, and release of radio resources between a UA and a network node or other LTE equipment. The RRC protocol is described in detail in the Third Generation Partnership Project (3GPP) Technical Specification (TS) 36.331. According to the RRC protocol, the two basic RRC modes for a UA are defined as "idle mode" and "connected mode." During the connected mode or state, the UA may exchange signals with the network and perform other related operations, while during the idle mode or state, the UA may shut down at least some of its connected mode operations. Idle and connected mode behaviors are described in detail in 3GPP TS 36.304 and TS 36.331.

The signals that carry data between UAs, relay nodes, and access nodes can have frequency, time, and coding parameters and other characteristics that might be specified by a network node. A connection between any of these elements that has a specific set of such characteristics can be referred to as a resource. The terms "resource," "communications connection," "channel," and "communications link" might be used synonymously herein. A network node typically establishes a different resource for each UA or other network node with which it is communicating at any particular time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3A is a flowchart illustrating initial access of a user agent to a network, as implemented by a user agent, according to an embodiment of the disclosure.

FIG. 3B is a flowchart illustrating initial access of a user agent to a network, as implemented by an access node, according to an embodiment of the disclosure.

FIG. 3C is a flowchart illustrating initial access of a user agent to a network, as implemented by a relay node, according to an embodiment of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
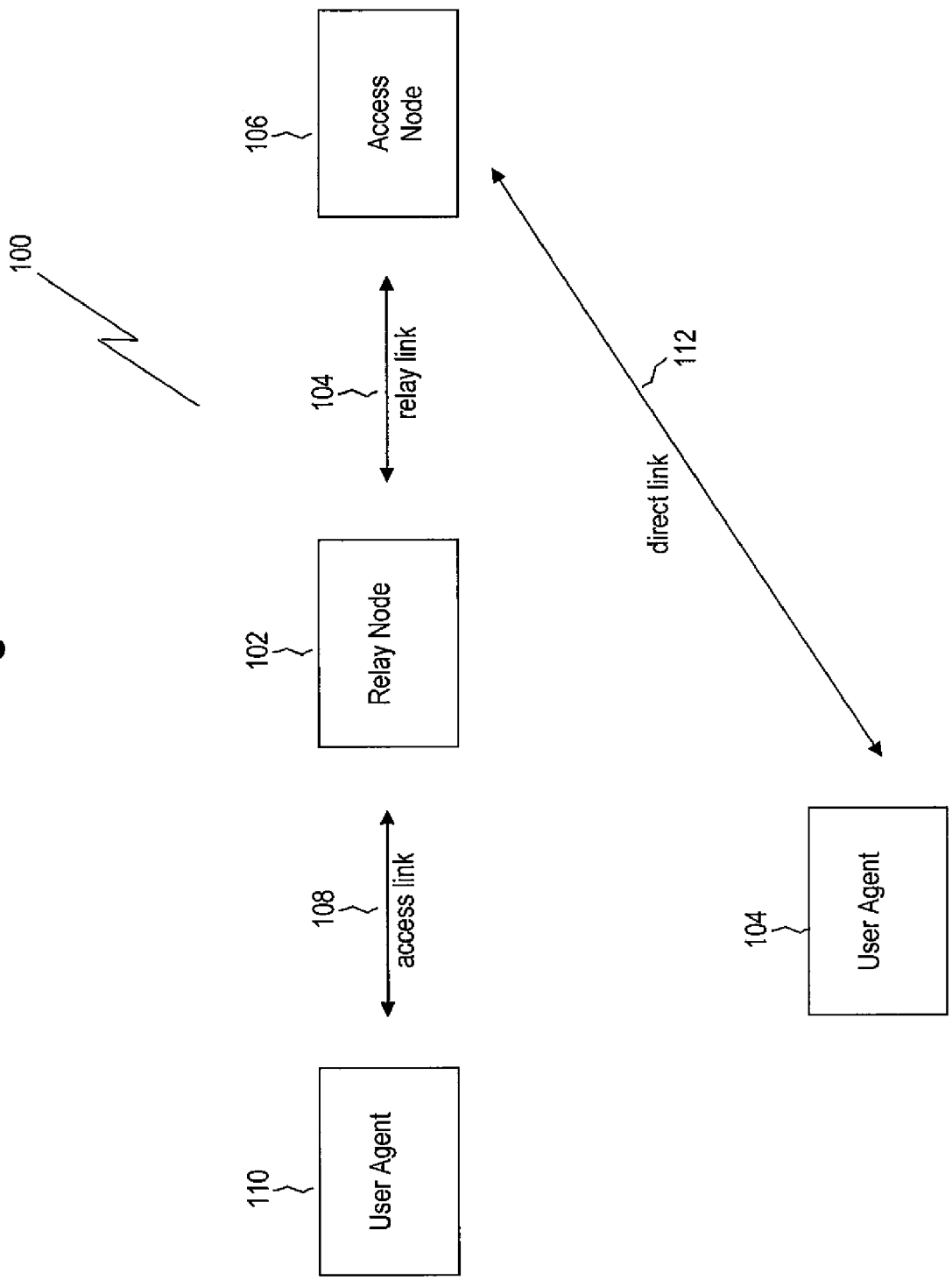
FIG. 1 is a diagram illustrating a wireless communication system that includes a relay node, according to an embodiment of the disclosure.

FIG. 1 is a diagram illustrating a wireless communication system 100 using a relay node 102, according to an embodiment of the disclosure. Generally, the present disclosure relates to the use of relay nodes in wireless communications networks. Examples of wireless communication networks include LTE or LTE-Advanced (LTE-A) networks, and all of the disclosed and claimed embodiments could be implemented in an LTE-A network. The relay node 102 can amplify or repeat a signal received from a UA 110 and cause the modified signal to be received at an access node 106. In some implementations of a relay node 102, the relay node 102 receives a signal with data from the UA 110 and then generates a new signal to transmit the data to the access node 106. The relay node 102 can also receive data from the access node 106 and deliver the data to the UA 110. The relay node 102 might be placed near the edges of a cell so that the UA 110 can communicate with the relay node 102 rather than communicating directly with the access node 106 for that cell.

In radio systems, a cell is a geographical area of reception and transmission coverage. Cells can overlap with each other. In the typical example, there is one access node associated with each cell. The size of a cell is determined by factors such as frequency band, maximum transmit power levels, and channel conditions. Relay nodes, such as relay node 102, can be used to enhance coverage within or near a cell, or to extend the size of coverage of a cell. Additionally, the use of a relay node 102 can enhance throughput of a signal within a cell because the UA 110 can access the relay node 102 at a higher data rate than the UA 110 might use when communicating directly with the access node 106 for that cell. Transmission at a higher data rate creates higher spectrum efficiency. Sometimes the UA 110 can transmit at lower power to the relay node 102 than it can to the access node 106. Lower power transmissions benefit the UA 110 by consuming less battery power.

Relay nodes, generally, can be divided into three types: layer one relay nodes, layer two relay nodes, and layer three relay nodes. A layer one relay node is essentially a repeater that can retransmit a transmission without any modification other than amplification and slight delay. A layer two relay node can decode a transmission that it receives, re-encode the result of the decoding, and then transmit the re-encoded data. A layer three relay node can have full radio resource control capabilities and can thus function similarly to an access node. The radio resource control protocols used by a relay node may be the same as those used by an access node, and the relay node may have a unique cell identity typically used by an access node. For the purpose of this disclosure, a relay node is distinguished from an access node by the fact that it requires the presence of at least one access node (and the cell associated with that access node) to access other components in a telecommunications system. The illustrative embodiments are primarily concerned with layer two or layer three relay nodes. Therefore, as used herein, the term "relay node" will not refer to layer one relay nodes, unless specifically stated otherwise.

In communication system 100, the links that allow wireless communication can be said to be of three distinct types. First, when the UA 110 is communicating with the access node 106 via the relay node 102, the communication link between the UA 110 and the relay node 102 is said to occur over an access link 108. Second, the communication between the relay node 102 and the access node 106 is said to occur over a relay link 104. Third, communication that passes directly between the UA 110 and the access node 106 without passing through the relay node 102 is said to occur over a direct link 112. The terms "access link," "relay link," and "direct link" are used in this document according to the meaning described by FIG. 1.

An issue with confusion can arise in wireless communication systems that use relay nodes. For example, a UA transmits signals that can be received by both an access node and a relay node. If a signal is received and processed by an access node, and then the relay node processes and forwards the same signal to the access node, then confusion could result.

This issue of confusion can arise during the initial access procedure when a UA attempts to connect to a network. For example, if a UA initiates connection request signals and they are received at both an access node and a relay node, then confusion could result if both the access node and the relay node accept the request of the UA.

The illustrative embodiments address some of these concerns of confusion during initial access of a UA to a network that includes relay nodes. Two primary methods are presented, though others are possible. One method is for a UA to connect to an access node, and then have the access node hand off the UA to a relay node that might have better signal reception strength relative to the UA. Thus, the illustrative embodiments provide for a UA in a wireless communication system that is configured to transmit a preamble on a random access channel (RACH) to an access node in order to attach to the access node. Further, the UA transmits a message to the access node, wherein the message contains an identity of one or more relay nodes to which the UA can be transferred. The UA requests the access node to hand-over the UA to one relay node of the one or more relay nodes.

A second method is to introduce devices and methods that allow the UA to connect directly to a relay node or an access node, but without giving rise to confusion at the device to which the UA does not want to connect. This second method could be implemented, in one illustrative embodiment, by using sets of preambles. If a preamble sent by a UA is one from a particular set of preambles known to belong to the relay node, then the relay node will accept the attach request from the UA; however, these preambles may be such that the access node will ignore the following messages that are part of the attach or connect procedure associated with the set of preambles. Likewise, the UA could attach directly to access nodes using a second set of preambles acceptable to the access nodes, but where the second set of preambles are ignored by the relay nodes.

Figure 2:
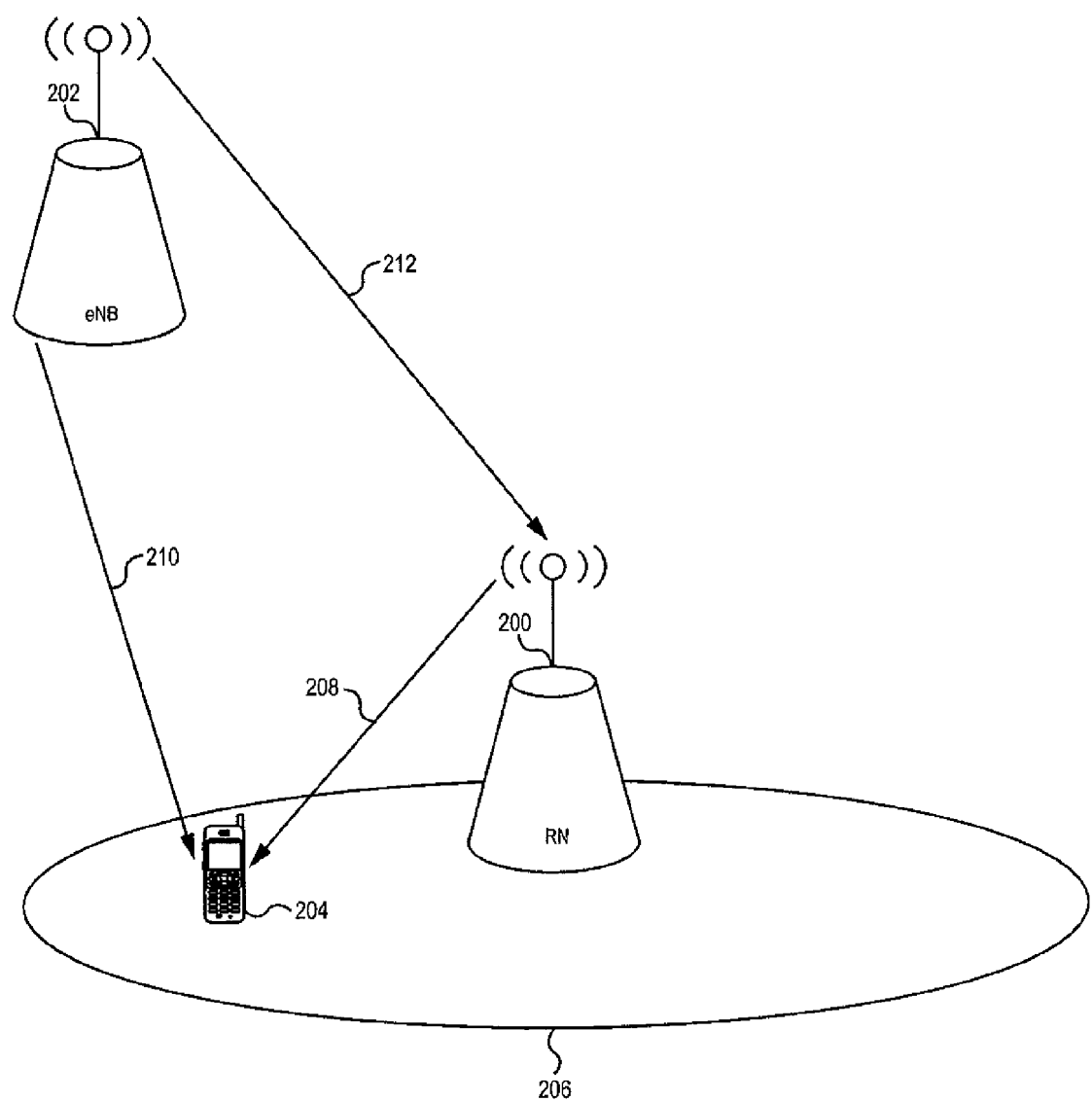
FIG. 2 is a block diagram of a relay node in communication with an access node and a user agent, according to an embodiment of the disclosure.

FIG. 2 is a block diagram of a relay node 200 in communication with an access node 202 (further labeled as "eNB" to show an exemplary access node) and a UA 204, according to an embodiment of the disclosure. These devices are similar to, and operate in a manner similar to, corresponding devices in FIG. 1. Thus, for example, relay node 200 could be relay node 102 in FIG. 1, access node 202 could be access node 106 in FIG. 1, and UA 204 could be UA 110 in FIG. 1. To provide further context, relay node 200 operates within a cell 206. As shown in FIG. 2, access node 202 operates outside cell 206; however, access node 202 could operate within cell 206. In the illustrative embodiments described herein, UA 204 is in cell 206; however, UA 204 could operate outside cell 206 but within range of access node 202.

A brief description is provided of how initial access of UA 204 to a network can function. Initial access in LTE networks starts with a random access (RA) procedure. The term "initial access" refers to the first attempt of a UA to gain access to the network and start active communication. For example, initial access can occur when the UA moves from "RRC_IDLE" to "RRC_CONNECTED" mode, as those terms are defined in the 3GPP specifications. As another example, initial access also can occur when the UA loses uplink timing alignment.

The random access procedure begins with the UA using an uplink (UL) random access channel (RACH) and sending a preamble to a receiving device, such as relay node 200 or access node 202. The preamble is an encoded sequence of bits.

The receiving device responds, if the preamble is successfully decoded, by granting the UA resources to send uplink information to continue the attachment to the network. The receiving device also calculates the timing advance that the UA should use for its subsequent uplink transmissions.

Turning now to the illustrative embodiments, care must be taken when developing a method for accessing relay nodes by the UA. One issue that should be considered is that layer two relay nodes may not have a radio resource control (RRC) stack. Another issue is that a preamble may be received by both relay nodes, such as relay node 200, and access nodes, such as access node 202. The illustrative embodiments address these issues by at least two methods. The first method is that initial access is made with the access node 202, with the access node 202 subsequently handing over the UA 204 to the relay node 200. The second method is that the UA 204 directly attaches to the relay node 200. These methods will be addressed in detail below.

The first method is, again, for the UA 204 to obtain initial access with the access node 202 and for the access node 202 to hand-over the UA 204 to the relay node 200. Generally, if a UA in "RRC_IDLE" mode is in a network with relay nodes, the UA may desirably access the relay node if 1) the UA "knows" that relay nodes are nearby and within radio propagation distance and 2) the UA determines to transmit or receive a communication. Also, generally, UAs in RRC_IDLE mode should follow cell selection and reselection procedures provided in the LTE 3GPP specifications. Thus, the UAs will attempt to identify nearby relay nodes, sometimes by measuring signal strengths from the relay nodes, and often will monitor the broadcast channel and signal strengths from access nodes.

In an illustrative embodiment, the process begins by the UA 204 sending a preamble on a random access channel (RACH), with the intent of attaching to the access node 202. The selection of preamble is important, and is described further below. After sending the preamble, the UA 204 will complete the process of attaching to the access node 202 by exchanging a predefined sequence of messages. The UA 204 will then be in RRC_CONNECTED mode.

At this point, the UA 204 sends a message to the access node 202. The message contains the identifications (IDs) of all relay nodes, such as relay node 200, which would be candidates to which the UA 204 could attach. The message can take at least two forms. In one form, the message is an augmentation of a radio resource control (RRC) measurement report message. In another form, the message can be a distinct message created for the purpose of transmitting relay node IDs between the UA 204 and the access node 202. In either case, the message should contain power measurements of the one or more relay node candidates.

In effect, the UA 204 requests to be handed over to one of the candidate relay nodes. In this example, UA 204 requests to be handed over to relay node 200. The UA 204 can begin the process of handover by sending a second preamble to the relay node 200. The UA 204 may be instructed how and when to send the preamble by the access node 202 during the handover procedure. The second preamble allows the relay node 200 to attain timing alignment so that the UA 204 can transmit data and possibly resource information to the relay node 200. The second preamble may be a dedicated preamble that the access node 202 allocates to the UA 204 to access the relay node 200. The access node 202 may also need to notify the relay node 200 about the dedicated preamble that the UA 204 will use to access the relay node 200. At this point, the access node 202 hands over responsibility for communication with the UA 204 to the relay node 200.

In another illustrative embodiment, the UA chooses a desired relay node. The UA then sends the request to the access node. The access node may or may not accept the request from the UA. When the access node responds to the UA with the decision, the access node may also indicate a dedicated preamble that the UA may use to perform the initial access with the desired relay node. In the meantime, the access node notifies the relay node of the dedicated preamble that was indicated to the UA. In this manner, the initial access of the UA to the relay node can be performed more quickly.

Thus, the illustrative embodiments provide for a mechanism of initial access of a UA 204 to an access node 202, with the UA 204 then being handed over to a relay node 200. As mentioned above, in another illustrative embodiment, a second method of dealing with the issue of confusion is for the UA 204 to attach directly to the relay node 200. This second method is described further below.

If the UA 204 can successfully identify that it is in cell 206, which can be referred to as a relay node donor cell, then the UA 204 can save battery life and time by attempting to attach to the relay node 200. To attach to the relay node 200, the UA 204 will send a preamble to the relay node 200. Again, the preamble is described further below. The UA 204 will normally send the preamble in cases where the relay node 200 has a much better signal strength relative to access node 202 or to other relay nodes.

Once the relay node 200 receives the preamble, the relay node 200 will forward the representative information to the access node 202 according to one of two methods. In a first method, the relay node 200 will send a second preamble on the random access channel (RACH) with the identification of the UA 204 (UA ID). This procedure is almost identical to the UA 204 sending the preamble itself. According to the second method, the relay node 200 will send a separate message with the UA ID to the access node 202. Because no standard radio resource control (RRC) stack exists on a layer two relay node, the separate message may use a new message type and acknowledgement scheme. The layer two relay nodes may instead incorporate a part of the RRC stack that contains standardized messages necessary for sending the UA ID. Further, a part of the RRC stack may be instead incorporated in the layer two relay nodes and a standard message can be altered to communicate the UA ID.

In either case, the radio resource control messages for attaching to the network will come from the access node 202. The access node 202 will respond by sending the attach messages through the relay node 200. The relay node 200 will measure timing alignment. The relay node 200 will then provide the timing alignment information to the access node 202, or will insert the timing alignment information in downlink messages transmitted to the UA (for those messages that require or desire timing alignment to be inserted).

In an illustrative embodiment, if the UA has beam-steering or beam forming technology available, the UA 204 can steer the signal towards the relay node 200. Steering the signal will make the possibility of intercept by the access node 202 less likely, and thus will reduce the probability of undesirable confusion. Beam steering may make interception by an extraneous access node possible; however, the random access preambles are known and would conflict within the extraneous access node. Because of this conflict, the extraneous access node would ignore the steered signal.

Thus, the illustrative embodiments provide for at least two methods of initial access of a UA 204 to a relay node 200, and in particular to a layer two relay node. As mentioned in the description of the above-described two methods, selection and transmission of a preamble can be important. For example, a complication that can be encountered when sending preambles on an uplink is that access nodes and relay nodes in the neighborhood may be able to detect the preamble. Thus, the following description relates to issues surrounding the preambles communicated amongst the UA 204, relay node 200, and access node 202.

Detection of a preamble by both a relay node 200 and an access node 202 may be common, because a UA 204 will often be closer to a relay node 200 than to an access node 202. Because preambles are part of the medium access control (MAC) protocol, and the relay nodes have medium access control capability, the relay nodes will see a preamble and want to respond with the access process. However, the access node 202 will also want to respond to the preamble with the access process.

This potential confusion can be handled using at least two methods. In a first method, a dedicated preamble or dedicated preamble subset is used when attempting to access a relay node 200. In a second method, the access node 202 is programmed to have specialized behavior such that the access node 202 will wait for the relay node 200 to report the receipt of the preamble. If the report of the receipt of the preamble does not come within a set time, the access node 202 will assume that the relay node 200 did not receive the preamble and complete the access procedure normally.

First, the method of using a dedicated preamble or dedicated preamble subset will be described. One purpose of the preamble is to indicate the temporary random access identification of the UA 204. In an illustrative embodiment, in Release 8 of the LTE 3GPP specifications, there exist 64 preambles in each cell, such as cell 206. In order to ease confusion as to whether a given random access attempt is intended for the relay node 200 or the access node 202, these 64 preambles can be separated into two or more groups. The UA 204 can use a preamble group that lets the access node 202 and the relay node 200 know that a given random access attempt is intended for a given device. Thus, for example, if a first group of preambles is used for access to the relay node 200, then the relay node 200 will accept preambles in the first group and ignore preambles in the second group. Likewise, if a second group of preambles is used for access to the access node 202, then the access node 202 will accept preambles in the second group and ignore preambles in the first group.

This division of preambles can be performed by the access node 202. The access node 202 can signal both the UA 204 and the relay node 200 as to how the preambles are divided. Thus, the UA 204 and the relay node 200 will know which set of preambles applies to the relay node 200 and which set of preambles applies to the access node 202.

Thus, the illustrative embodiments provide for a method of avoiding confusion during a random access procedure by using a dedicated preamble. In another method of avoiding confusion, the access node 202 is programmed to have specialized behavior such that the access node 202 will wait for the relay node 200 to report the receipt of the preamble.

Specifically, if the access node 202 receives a preamble, the access node 202 can delay a response to the UA 204 by a certain time, for example, several milliseconds or sub-frames, though a different delay time can be programmed. This delay allows the relay node 200 to alert the access node 202 that the relay node 200 has received a preamble as well. The alert can take the form of a separate, simple message containing information such as the identification of the UA and, perhaps, channel state information if the access node 202 is controlling the modulation and coding scheme (MCS) of the transmission to the UA 204. By delaying acknowledgement of a preamble when starting a random access procedure, confusion between the access node 202 and the relay node 200 may be avoided.

If the access node 202 receives the preamble, but does not receive a notification from the relay node 200, then the access node 202 will complete the access process normally. One reason that the access node 202 would not receive a notification is that relay node 200 received the preamble, but ignored the preamble. The relay node 200 could have ignored the preamble because the preamble is specifically dedicated to initial access. If the relay node 200 does receive the preamble, and does or does not notify the access node 202, the relay node 200 can use the preamble to attain timing alignment for possible communication with the UA 204.

One response that the access node 202 could receive from the relay node 200 is that the relay node 200 received the preamble, but the relay node 200 does not want the UA 204 to attach to the relay node 200. The access node 202 will usually handle admission control of UAs, but there may be rules that the relay node 200 must follow when accepting UAs.

If the access node 202 does receive a notification from the relay node 200, the access node 202 may complete the access process by sending messages to the UA 204 through the relay node 200, or by sending messages directly to the UA 204. If the messages go directly to the UA 204, then the access node 202 will follow the procedure as stated above, where the UA 204 will eventually be handed over to the relay node 200. The access node 202 will be aware that if the UA 204 does not receive a response after a certain time, that the UA 204 will resend the preamble. The access node 202 will ensure that the response takes place before the UA 204 resends the preamble.

The above devices and methods pertain to random access procedures in wireless communications, particularly with respect to the use of layer two relay nodes. Post access procedures will now be discussed.

In an illustrative embodiment, the UA 204 will maintain uplink timing alignment (UL TA) with the random access when the UA 204 is in RRC_CONNECTED mode. Timing alignment is first derived during the random access procedure. The UA 204 sends sounding reference signals (SRS) to maintain timing alignment. The configuration of the SRS pattern is determined by the access node 202, which in turn notifies the relay node 200 of the SRS pattern. The configuration can include at least the hopping patterns and repetition numbers, which convey which subcarriers to use.

An issue can arise with respect to interference of sounding reference signals from other UAs with cell 206 that are not attached to the relay node 200. However, these UAs will be known by the access node 202. Thus, access node 202 can determine the appropriate pattern to avoid interference.

Furthermore, the access node 202 should schedule other UAs not using relay node 200 (or other relay nodes) to use resource blocks (RBs) that are not available to the relay node 200. Thus, relay node 200 may handle less traffic and can have a smaller effective bandwidth. The UAs communicating with the access node 202 can use resource blocks that are not used by the relay node 200. For instance, a 20 MHz wide cell could devote the inner 5 MHz to the relay node 200 and the resource blocks falling outside of that to other UAs that may directly communicate with the access node 202.

FIG. 3A is a flowchart illustrating initial access of a UA to a network, as implemented by a UA, according to an embodiment of the disclosure. Examples of UAs in which this process can be implemented could be UA 110 of FIG. 1 or UA 204 of FIG. 2. The process shown in FIG. 3A can be implemented using the devices and methods described with respect to FIG. 2.

The process begins as the UA transmits a preamble on a random access channel to an access node (block 300A). In an illustrative embodiment, the preamble belongs to one of a plurality of categories of preambles. A first category of preambles can comprise those preambles that are dedicated for transmission to the access node. A second category of preambles can comprise those preambles that are dedicated for transmission to the relay node.

The UA then attaches to the access node (block 302A). The UA then identifies one or more relay nodes by measuring signals from the one or more relay nodes (block 304A). In an illustrative embodiment, measuring signals comprises measuring a power measurement of the signals.

The UA transmits a message to the access node, wherein the message contains an identity of one or more relay nodes to which the UA can be transferred (block 306A). In an illustrative embodiment, the message comprises an augmented radio resource control (RRC) measurement report message. However, in another illustrative embodiment, the message is a new radio resource control message distinct from a measurement report message.

The UA requests the access node to hand-over the UA to the one relay node of the one of or more relay nodes (block 308A). The UA transmits a second preamble to the one relay node (block 310A). The UA then attaches to the one relay node (block 312A). The process terminates thereafter.

FIG. 3B is a flowchart illustrating initial access of a UA to a network, as implemented by an access node, according to an embodiment of the disclosure. Examples of access nodes in which this process can be implemented could be access node 106 of FIG. 1 or access node 202 of FIG. 2. The process shown in FIG. 3B can be implemented using the devices and methods described with respect to FIG. 2.

The process begins as the access node receives a preamble on a random access channel from a UA (block 300B). In an illustrative embodiment, the preamble belongs to one of a plurality of categories of preambles, wherein a first category of preambles comprises those preambles that are dedicated for receipt by the access node. In this illustrative embodiment, the access node can be further configured to divide the plurality of categories of preambles into the first category and at least one other category of preambles. Whether or not the access node controls splitting of the categories of preambles, the access node attaches the UA to the access node (block 302B).

In an illustrative embodiment, the access node receives a message from the UA, wherein the message contains an identity of one or more relay nodes to which the UA can be transferred (block 304B). In an illustrative embodiment, message contains at least one power measurement indicative of strengths of signals received from the one or more relay nodes to the UA. The message can comprise an augmented radio resource control (RRC) measurement report message. In another illustrative embodiment, the message can comprise a new radio resource control message distinct from a measurement report message. In another illustrative embodiment, the access node can receive a report from the relay node that the relay node has received the preamble.

The access node receives a request from the UA to handover the UA to one relay node of the one or more relay nodes (block 306B). The access node then hands over the UA to the one relay node (block 308B). The process terminates thereafter.

FIG. 3C is a flowchart illustrating initial access of a UA to a network, as implemented by a relay node, according to an embodiment of the disclosure. Examples of relay nodes in which this process can be implemented could be relay node 102 of FIG. 1 or relay node 200 of FIG. 2. The process shown in FIG. 3C can be implemented using the devices and methods described with respect to FIG. 2.

The process begins as the relay node receives a preamble from a UA, wherein the preamble indicates a temporary random access identification of the UA (block 300C). The relay node then forwards the preamble to an access node (302C). Forwarding can be accomplished by using a random access channel (RACH), or by sending a message with the temporary random access identification to the access node. In an illustrative embodiment, the preamble can be forwarded using a message type and an acknowledgement scheme other than a radio resource control (RRC)

The relay node receives an attach message from the access node (bock 304C). The relay node then forwards the attach message to the UA, wherein the attach message is configured to instruct the UA to attach to the relay node (block 306C). The relay node then attaches the UA to the relay node (block 308C). The process terminates thereafter.

In another illustrative embodiment, the relay node can be configured to measure a timing alignment and then transmit the timing alignment to the access node. The timing alignment can also be transmitted to the UA.

In another illustrative embodiment, the relay node can be further configured to accept the preamble only if the preamble is in a first category of preambles of a plurality of categories of preambles. The first category of preambles comprises those preambles that are that are intended to be received by the relay node. In illustrative embodiment, a second category of preambles comprises those preambles that are intended to be received by an access node.

In another illustrative embodiment, the relay node can be further configured to transmit a message to the access node, wherein the message contains an indication that the relay node has received the preamble. The message can contain an identification of the UA and/or channel state information.

Figure 4:
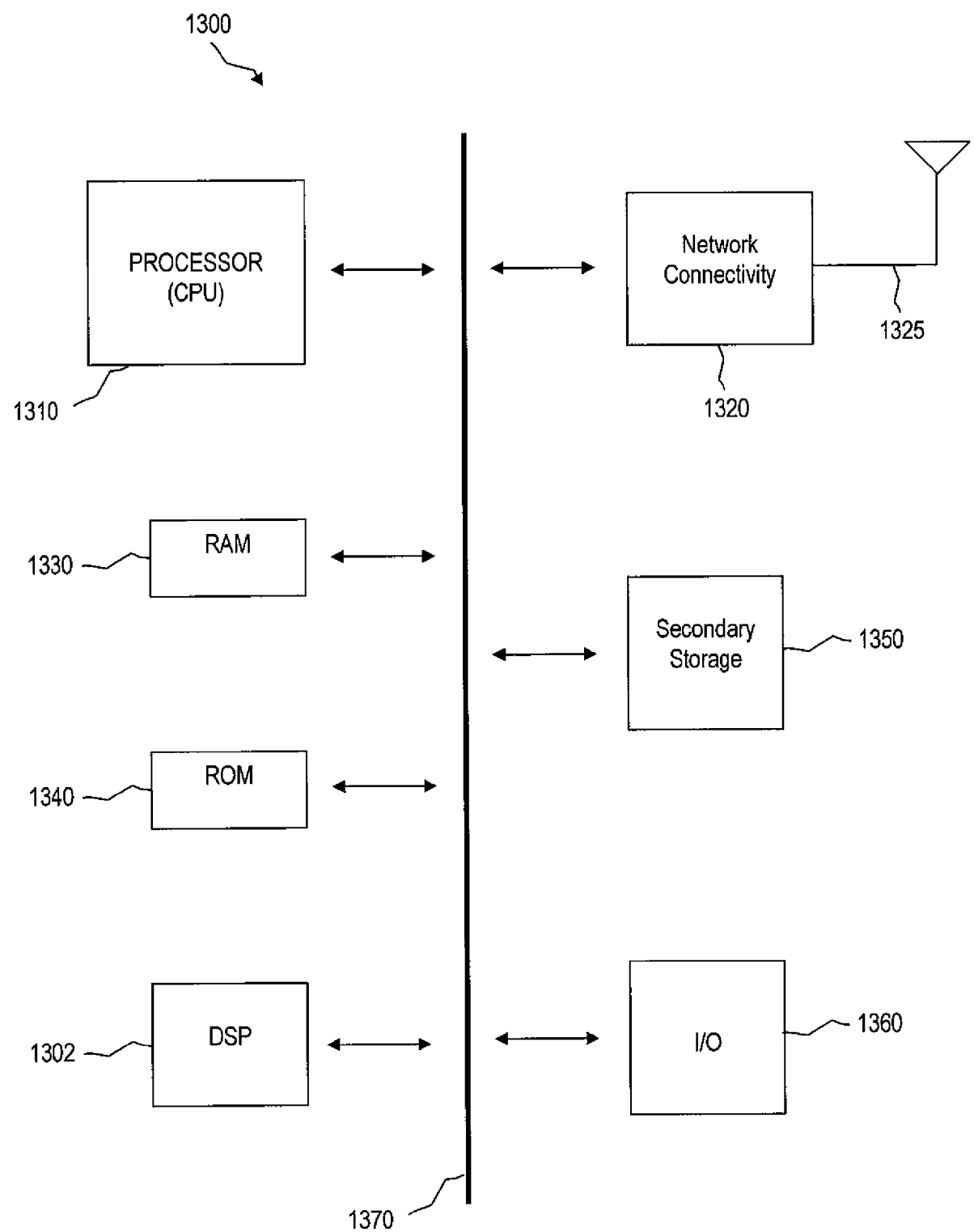
FIG. 4 illustrates a processor and related components suitable for implementing the several embodiments of the present disclosure.

The UA 110 and other components described above might include a processing component that is capable of executing instructions related to the actions described above. FIG. 4 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 502. Although the DSP 502 is shown as a separate component, the DSP 502 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320.

The following are incorporated herein by reference for all purposes: 3rd Generation Partnership Project (3GPP) Technical Specification (TS) 36.813 and 3GPP TS 36.814.

Thus, the illustrative embodiments provide for a UA. The UA is configured to transmit a preamble on a random access channel (RACH) to an access node; thereafter attach the UA to the access node; thereafter transmit a message to the access node, wherein the message contains an identity of one or more relay nodes to which the UA can be transferred; and request the access node to hand-over the UA to one relay node of the one or more relay nodes.

The illustrative embodiments also provide for an access node. The access node is configured to receive a preamble on a random access channel (RACH) from a UA; thereafter attach the UA to the access node; thereafter receive a message from the UA, wherein the message contains an identity of one or more relay nodes to which the UA can be transferred; and receive a request from the UA to hand-over the UA to one relay node of the one or more relay nodes.

The illustrative embodiments also provide for a relay node. The relay node is configured to receive a preamble from a UA, wherein the preamble indicates a temporary random access identification of the UA; and forward the preamble to an access node.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user agent, comprising:
a processor configured to promote transmission of a random access channel (RACH) preamble on a RACH to promote attachment of the user agent to an access node, wherein the processor is further configured to promote transmission of a message to the access node, wherein the message contains an identity of one or more relay nodes to which the user agent can be transferred, and wherein the processor is further configured to request the access node to hand-over the user agent to one of the relay nodes, and, after requesting, to promote transmission of a second RACH preamble to promote attachment of the user agent to the one of the relay nodes, wherein the second RACH preamble is one of a category of RACH preambles dedicated for transmission to the one of the relay nodes.

2. The user agent of claim 1 further configured to:
prior to transmitting the message, identify the one or more relay nodes by measuring signals from the one or more relay nodes.

3. The user agent of claim 2 wherein measuring signals comprises measuring a power measurement of the signals.

4. The user agent of claim 1 wherein the message comprises an augmented radio resource control (RRC) measurement report message.

5. The user agent of claim 1 wherein the message comprises a new radio resource control message distinct from a measurement report message.

6. The user agent of claim 1 wherein the second RACH preamble is allocated by the access node.

7. The user agent of claim 1 wherein the RACH preamble belongs to one of a plurality of categories of RACH preambles, wherein a first category of RACH preambles comprises those RACH preambles that are dedicated for transmission to the access node.

8. A method implemented in a user agent, the method comprising:
transmitting a random access channel (RACH) preamble on a RACH to promote attachment to an access node;
attaching to the access node;
transmitting a message to the access node, wherein the message contains an identity of one or more relay nodes to which the user agent can be transferred;
requesting the access node to hand-over the user agent to one of the relay nodes;
after requesting, transmitting a second RACH preamble to promote attachment to the one of the relay nodes; and
thereafter attaching the user agent to the one of the relay nodes, wherein the second RACH preamble is a dedicated RACH preamble.

9. The method of claim 8 wherein the message comprises a new radio resource control message distinct from a measurement report message.

10. The method of claim 8 wherein the second RACH preamble is allocated by the access node.

11. The method of claim 8 wherein the RACH preamble belongs to one of a plurality of categories of RACH preambles, wherein a first category of RACH preambles comprises those RACH preambles that are dedicated for transmission to the access node.

12. An access node, comprising:
a processor configured to receive a random access channel (RACH) preamble on a RACH from a user agent to promote attachment of the user agent to the access node, wherein the processor is further configured to receive a message from the user agent, wherein the message contains an identity of one or more relay nodes to which the user agent can be transferred, and wherein the processor is further configured to receive a request from the user agent to hand-over the user agent to one of the relay nodes, wherein the processor is further configured to signal a dedicated RACH preamble to the user agent to attach to the one of the relay nodes.

13. The access node of claim 12 wherein the message contains at least one power measurement indicative of strengths of signals received from the one or more relay nodes to the user agent.

14. The access node of claim 12 wherein the message comprises an augmented radio resource control (RRC) measurement report message.

15. The access node of claim 12 wherein the message comprises a new radio resource control message distinct from a measurement report message.

16. The access node of claim 12 wherein the processor is further configured to:
promote hand-over of the user agent to the one of the relay nodes.

17. The access node of claim 16 wherein the RACH preamble belongs to one of a plurality of categories of RACH preambles, wherein a first category of RACH preambles comprises those RACH preambles that are dedicated for receipt by the access node.

18. The access node of claim 17 wherein the access node is further configured to:
divide the plurality of categories of RACH preambles into the first category and at least one other category of RACH preambles.

19. The access node of claim 16 wherein the access node is further configured to:
before handing over the user agent to the one of the relay nodes, receive a report from the relay node that the relay node has received the RACH preamble.

20. A method implemented in an access node, the method comprising:
receiving a random access channel (RACH) preamble on a RACH from a user agent, wherein the RACH preamble belongs to a first category of RACH preambles in a plurality of categories of RACH preambles, wherein the first category of RACH preambles comprises those RACH preambles that are dedicated for receipt by the access node;
attaching the user agent to the access node;
receiving a message from the user agent, wherein the message contains an identity of one or more relay nodes to which the user agent can be transferred; and
receive a request from the user agent to hand-over the user agent to one of the relay nodes.

21. The method of claim 20, further comprising:
dividing the plurality of categories of RACH preambles into the first category and at least one other category of RACH preambles.

22. The method of claim 20 wherein the access node signals a dedicated RACH preamble to the user agent to attach to the one of the relay nodes.

23. A relay node comprising:
a processor configured to receive a random access channel (RACH) preamble from a user agent over a RACH, wherein the RACH preamble indicates a temporary random access identification of the user agent, and wherein the processor is further configured to forward the RACH preamble to an access node over a RACH.

24. The relay node of claim 23 wherein the relay node forwards the RACH preamble by sending a message with the temporary random access identification to the access node.

25. The relay node of claim 23 wherein the relay node is further configured to:
receive an attach message from the access node that has decided the user agent can attach to the relay node; and
forward the attach message to the user agent, wherein the attach message is configured to instruct the user agent to attach to the relay node.

26. The relay node of claim 23 wherein the relay node is further configured to forward the RACH preamble using a message type and an acknowledgement scheme other than a radio resource control (RRC).

27. The relay node of claim 23 wherein the relay node is further configured to:
calculate a timing alignment value; and
transmit the timing alignment value to the access node.

28. The relay node of claim 27 wherein the relay node is further configured to:
transmit the timing alignment value to the user agent.

29. The relay node of claim 23 wherein the relay node is further configured to:
accept the RACH preamble only if the RACH preamble is in a first category of RACH preambles of a plurality of categories of RACH preambles, wherein the first category of RACH preambles comprises those RACH preambles that are intended to be received by the relay node.

30. The relay node of claim 23 wherein the relay node is further configured to:
transmit a message to the access node, wherein the message contains an indication that the relay node has received the RACH preamble.

31. The relay node of claim 30 wherein the message further contains an identification of the user agent.

32. The relay node of claim 31 wherein the message further contains channel state information.

33. A method implemented in a relay node, the method comprising:
receiving a random access channel (RACH) preamble from a user agent over a RACH, wherein the RACH preamble indicates a temporary random access identification of the user agent; and
forwarding the RACH preamble to an access node over a RACH.

34. The method of claim 33 further comprising:
accepting the RACH preamble only if the RACH preamble is in a first category of RACH preambles of a plurality of categories of RACH preambles, wherein the first category of RACH preambles comprises those RACH preambles that are intended to be received by the relay node.

* * * * *